United States Patent
Chapman et al.

(10) Patent No.: US 9,878,771 B2
(45) Date of Patent: Jan. 30, 2018

(54) INCOMBUSTIBLE, NON-TELEGRAPHING SUBSTRATES FOR AVIATION PANEL ASSEMBLIES AND METHODS FOR INSTALLING THE INCOMBUSTIBLE, NON-TELEGRAPHING SUBSTRATE INTO AN AVIATION PANEL ASSEMBLY

(71) Applicant: GOODRICH CORPORATION, Charlotte, NC (US)

(72) Inventors: Christopher L. Chapman, Lanesville, IN (US); Ashish Kumar Agarwal, Bangalore Karnataka (IN); Chana Kesava Reddy, Kushaiguda (IN)

(73) Assignee: GOODRICH CORPORATION, Charlotte, NC (US)

( * ) Notice: Subject to any disclaimer, the term of this patent is extended or adjusted under 35 U.S.C. 154(b) by 179 days.

(21) Appl. No.: 14/964,173

(22) Filed: Dec. 9, 2015

(65) Prior Publication Data
US 2017/0166294 A1 Jun. 15, 2017

(51) Int. Cl.
*B64C 1/40* (2006.01)
*B64C 1/06* (2006.01)
*B64D 11/00* (2006.01)
*B64C 1/00* (2006.01)

(52) U.S. Cl.
CPC .............. *B64C 1/40* (2013.01); *B64C 1/066* (2013.01); *B64D 11/00* (2013.01); *B64C 2001/0072* (2013.01)

(58) Field of Classification Search
CPC .......... B32B 21/08; B32B 27/20; B32B 7/12; B64C 1/40
See application file for complete search history.

(56) References Cited

U.S. PATENT DOCUMENTS

| | | | | |
|---|---|---|---|---|
| 6,643,991 B1* | 11/2003 | Moyes | .................... | E06L 35/16 428/902 |
| 6,855,393 B1* | 2/2005 | Ayres | ........................ | B32B 3/12 156/306.9 |
| 7,598,460 B2* | 10/2009 | Roberts, IV | ......... | H05K 9/0001 174/382 |
| 2006/0248833 A1* | 11/2006 | Autovino | ................ | E06L 33/72 52/455 |
| 2009/0255694 A1* | 10/2009 | Peltz | ...................... | B65D 88/14 169/48 |
| 2011/0283458 A1* | 11/2011 | Gillette | ................ | A47C 31/001 5/698 |
| 2012/0015176 A1* | 1/2012 | Riebel | ..................... | B32B 27/06 428/323 |

* cited by examiner

*Primary Examiner* — Justin M Benedik
(74) *Attorney, Agent, or Firm* — Snell & Wilmer, L.L.P.

(57) ABSTRACT

An incombustible, non-telegraphing substrate for facing with a decorative aviation veneer is provided. The incombustible, non-telegraphing substrate comprises a backing layer comprising a polymer resin-impregnated paper and a fire-retardant chemical included in the backing layer and rendering the backing layer incombustible. An aviation panel and a method for installing the incombustible, non-telegraphing substrate in the aviation panel assembly are also provided.

20 Claims, 5 Drawing Sheets

INCOMBUSTIBLE, NON-TELEGRAPHING SUBSTRATES FOR AVIATION PANEL ASSEMBLIES AND METHODS FOR INSTALLING THE INCOMBUSTIBLE, NON-TELEGRAPHING SUBSTRATE INTO AN AVIATION PANEL ASSEMBLY

FIELD

The present disclosure relates generally to aviation interiors. More particularly, the present disclosure relates to incombustible, non-telegraphing substrates for aviation panel assemblies and methods for installing the incombustible, non-telegraphing substrate into an aviation panel assembly.

BACKGROUND

Conventional aviation panels (referred to as "aviation plywood) for aircraft interiors include a wood substrate of one or more plies faced with a decorative aviation veneer. The wood substrate has a grain pattern that may become visible in the decorative aviation veneer, a problem known as telegraphing. The telegraphing grain pattern in the decorative aviation veneer is unacceptable aesthetically as it detracts from the beauty of the veneer. Telegraphing results in customer returns, replacement, repair, and waste.

SUMMARY

An incombustible, non-telegraphing substrate is provided for facing with a decorative aviation veneer, according to various embodiments. The incombustible, non-telegraphing substrate comprises a backing layer comprising a polymer resin-impregnated paper and a fire-retardant chemical included in the backing layer and rendering the backing layer incombustible.

An aviation panel assembly is provided according to various embodiments. The aviation panel assembly comprises a decorative aviation veneer and an incombustible, non-telegraphing substrate faced with the decorative aviation veneer. The incombustible, non-telegraphing substrate comprises a backing layer comprising a polymer-resin impregnated paper, a fire-retardant chemical included in the incombustible, non-telegraphing substrate, and a first adhesive layer between the backing layer and the decorative aviation veneer.

A method is provided for installing an incombustible, non-telegraphing substrate in an aviation panel assembly, according to various embodiments. The method comprises adhering the incombustible, non-telegraphing substrate to a first surface of a decorative aviation veneer.

In any of the foregoing embodiments, the decorative aviation veneer has a first surface and a second surface opposite to the first surface and the backing layer is configured to cover the first surface of the decorative aviation veneer. A first adhesive attaches the first side of the backing layer to the first surface of the decorative aviation veneer. A wood sub-layer having a ply covers the second side of the backing layer. The wood sub-layer is adhered to the second side of the backing layer. A second adhesive attaches the wood sub-layer to the second side of the backing layer. The backing layer has a first side and a second side. The first adhesive layer is between the first side of the backing layer and the first surface of the decorative aviation veneer. The incombustible, non-telegraphing substrate backing layer directly covers the first surface of the decorative aviation veneer. The aviation panel assembly may further comprise a wood sub-layer of one ply and a second adhesive layer between the wood sub-layer and the second side of the backing layer. The wood sub-layer covers the second side of the backing layer. The aviation panel assembly is configured for an aircraft interior and the first surface of the decorative aviation veneer is configured to be visible therein. The aviation panel assembly may further comprise a honeycomb panel and a third adhesive layer between the honeycomb panel and at least one of the backing layer or the wood sub-layer. Adhering the incombustible, non-telegraphing substrate comprises adhering a backing layer to cover the first surface of the decorative aviation veneer. Adhering the first side of the backing layer directly to the first surface of the decorative aviation veneer. Prior to adhering the incombustible, non-telegraphing substrate to the first surface of the decorative aviation veneer, a wood sub-layer is adhered to the second side of the backing layer; and the backing layer and wood sub-layer are fire treated after adhering the wood sub-layer to the second side of the backing layer. The aviation panel assembly is fire treated after adhering the incombustible, non-telegraphing substrate to the first surface of the decorative aviation veneer. A structural member may be attached to an exposed ply of the wood sub-layer. Attaching the structural member to the exposed ply comprises adhering the structural member to the exposed ply of the wood sub-layer using a third adhesive.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Various embodiments are directed to incombustible, non-telegraphing substrates for aviation panel assemblies used in aircraft interiors and methods for installing the incombustible, non-telegraphing substrate into the aviation panel assembly. The incombustible, non-telegraphing substrates substantially prevent telegraphing of a grain pattern into a decorative aviation veneer of the aviation panel assembly and are incombustible. The term "non-telegraphing" refers to the substantial prevention of the grain pattern from an underlying material (e.g., a wood sub-layer as herein described) to be visible in the decorative aviation veneer. As used herein, the term "incombustible" refers to an aviation material that complies with 14 Code of Federal Regulations (CFR) 25.853. Federal Aviation Regulation 25.853. Appendix F sets forth the test criteria acrd procedures for showing compliance with §25.853. More specifically, Appendix F provides in part: (a) Material test criteria—(1) Interior compartments occupied by crew or passengers. (i) Interior ceiling panels, interior wall panels, partitions, galley structure large cabinet walls, structural flooring, and materials used in the construction of stowage compartments (other than undersea stowage compartments and compartments for stowing small items such as magazines and maps) must be self-extinguishing when tested vertically in accordance with the applicable portions of part I of this appendix. The average burn length may not exceed 6 inches and the average flame time after removal of the flame source may not exceed 15 seconds. Drippings from the test specimen may not continue to flame for more than an average of 3 seconds after falling.

Figure 1:
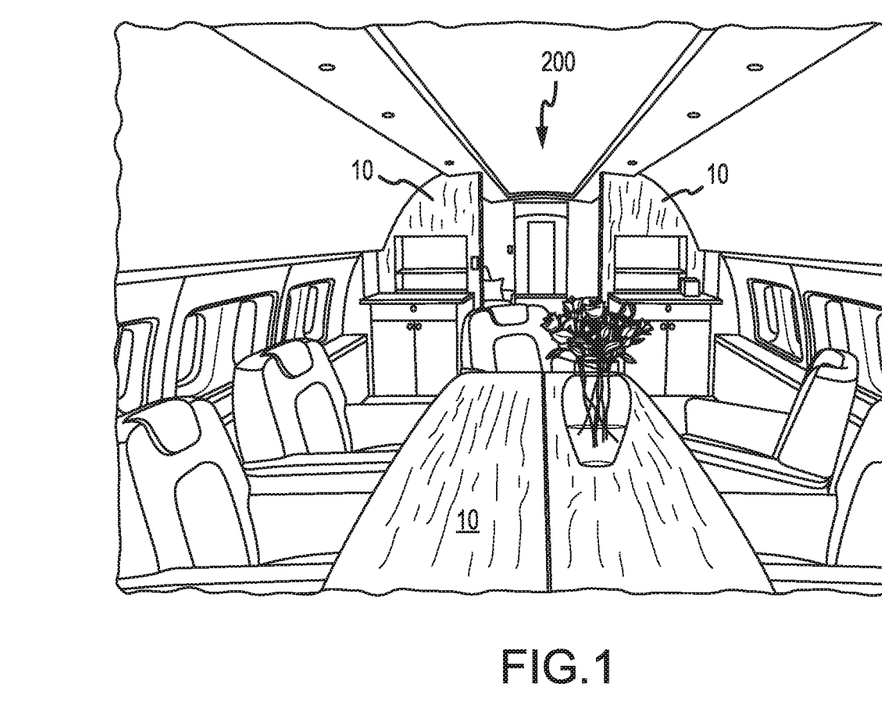
FIG. 1 shows a table top of an aircraft interior, the table top comprising an aviation panel assembly, according to various embodiments.
Figure 2:
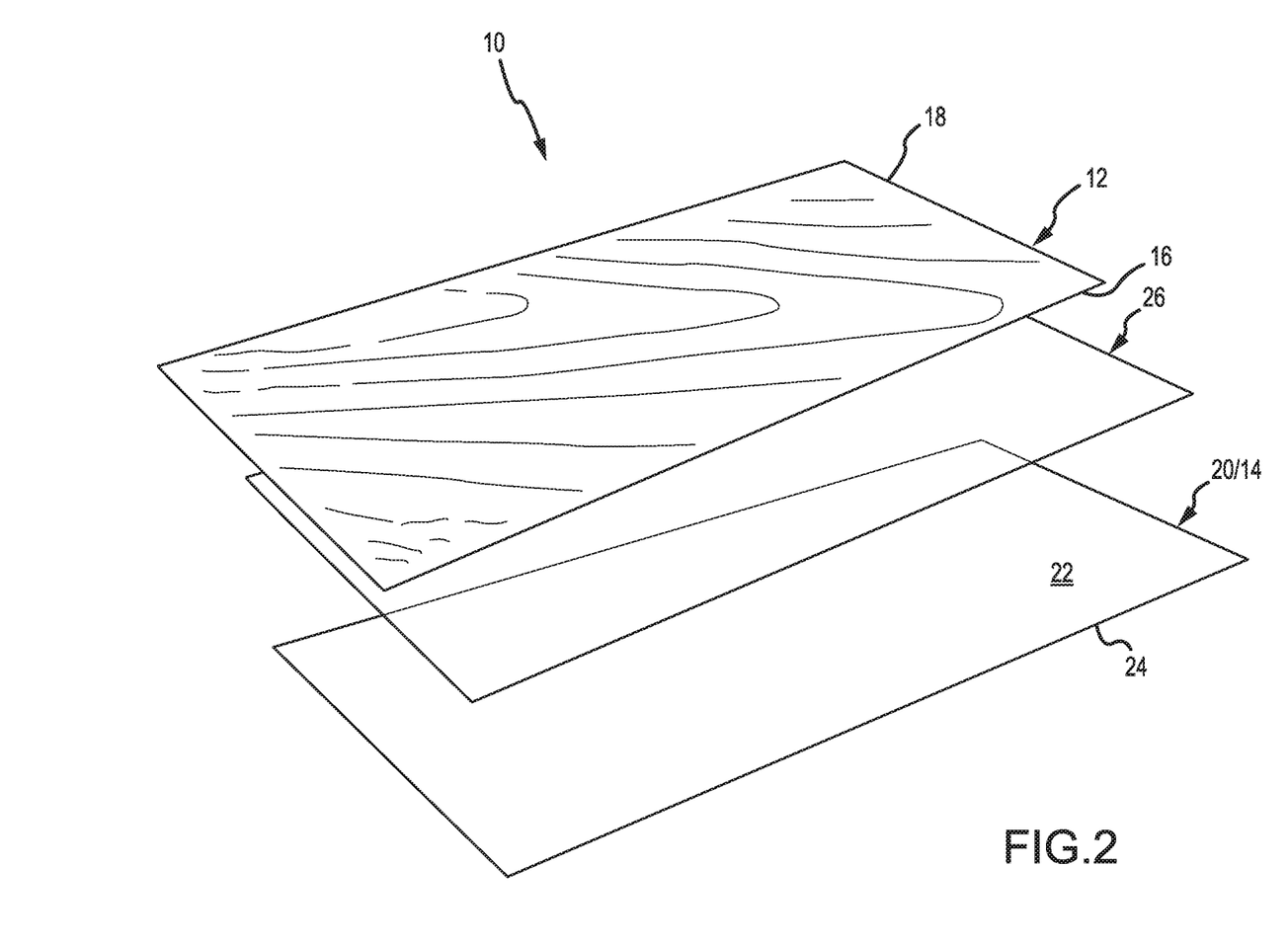
FIG. 2 is an assembly view of an exemplary aviation panel assembly (two ply), illustrating a decorative aviation veneer facing an incombustible, non-telegraphing substrate comprising a backing layer with a first adhesive layer between the decorative aviation veneer and the incombustible, non-telegraphing substrate, according to various embodiments.

Referring now to FIGS. 1 and 2, according to various embodiments, an aviation panel assembly 10 used in an aircraft interior 200 (see, e.g., FIG. 1) comprises a decorative aviation veneer 12 adhered to an incombustible, non-telegraphing substrate 14. The decorative aviation veneer 12 is used for facing the incombustible, non-telegraphing substrate 14. As used herein, the terms "faces" and "facing" refers to the decorative aviation veneer being the outside layer covering the incombustible, non-telegraphing substrate 14. While decorative veneers are used in other industries to make, for example, furniture, cabinets, etc., decorative aviation veneers 12 are typically held to stringent aesthetic and regulatory standards. For example, decorative aviation veneers 12 used primarily for private aircraft are desirably cut from wood logs that have aesthetically pleasing grain with low prevalence of defects. To ensure consistency throughout the aircraft interior, it may be necessary to use a single log in its entirety. The rarity of such wood logs, coupled with the volume used in a typical aircraft interior makes decorative aviation veneers much more expensive relative to other decorative veneers. The decorative aviation veneers may be manufactured from most wood species, common and exotic alike. The decorative aviation veneer may also be manufactured from composite material and referred to as "composite veneer." Thus, the decorative aviation veneer 12 may be real wood (a natural species) or a natural or synthetic composite veneer. The veneer thickness typically ranges between about 16 to about 25 mils (about 0.00041 to about 0.00064 meters) thick, although other thicknesses may be used. The term "about" in this context only means+/−5%. The decorative aviation veneer has a first surface 16 and a second surface 18 for purposes as herein described. The decorative aviation veneer 12 is configured to face the incombustible, non-telegraphing substrate 14 according to various embodiments as herein described. Hence, the decorative aviation veneer 12 may also be known herein as a "face veneer." The decorative aviation veneer 12 may be commercially available.

Still referring to FIG. 2, according to various embodiments, the incombustible, non-telegraphing substrate 14 comprises a backing layer 20 having a first side 22 and a second side 24 opposite to the first side. The backing layer 20 comprises a polymer resin-impregnated paper. The polymer-resin-impregnated paper may comprise about 70 to about 90 weight percent cellulose and about 10 to about 36 weight percent polyurea, wherein the term "about" in this context only means+/−5%. It contains no added formaldehyde. The polymer resin-impregnated paper has an auto ignition temperature of about 400° Fahrenheit to about 500° Fahrenheit (about 204 to about 260° Celsius), wherein the term "about" in this context only means+/−5%. The backing layer 20 is homogenous (i.e., it does not include grain patterns). In various embodiments, the backing layer does not substantially contract or expand in response to the presence of ambient moisture. A suitable backing layer is commercially available from Richwood Industries, Inc. (Grand Rapids, Mich. (USA)) under the trademark POLY-BAK™ and available in a variety of thicknesses, such as an 11 mil and a 20 mil (0.00028 meters to 0.00051 meters) thickness. Other thicknesses may be used in accordance with various embodiments.

The incombustible, non-telegraphing substrate 14 is adhered to the first surface 16 of the decorative aviation veneer (the face layer) 12, thereby forming the aviation panel assembly 10 according to various embodiments. More particularly, the incombustible, non-telegraphing substrate 14 is configured to be adhered to and cover the first surface 16 of the decorative aviation veneer 12. A first adhesive layer 26 attaches the first side 22 of the backing layer 20 to the first surface 16 of the decorative aviation veneer 12. The first adhesive layer 26 comprises a first adhesive. Exemplary non-limiting first adhesives that may be used include a phenolic dry glue film (PGF), an epoxy-based dry film, a polyurethane dry film, a polyvinyl alcohol (PVA) film, or the like. Other adhesives conventionally used in the wood industry may be used for the first adhesive and first adhesive layer 26.

Figure 3:
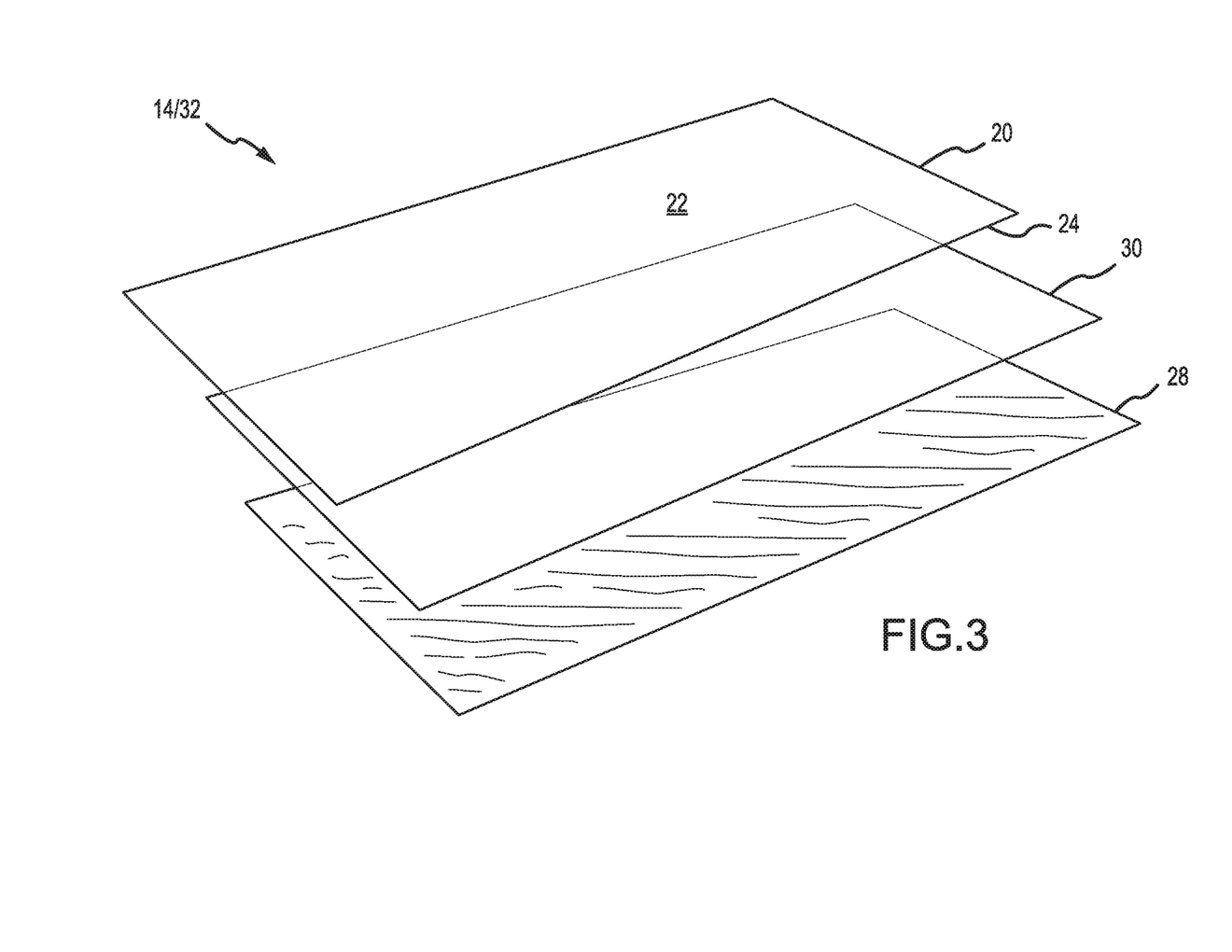
FIG. 3 is an assembly view of an exemplary incombustible, non-telegraphing substrate configured for attachment to a decorative aviation veneer for an aviation panel assembly, illustrating a backing layer and a wood sub-layer with a second adhesive layer between the backing layer and the wood sub-layer, according to various embodiments.

Referring now to FIG. 3, according to various embodiments, an incombustible, non-telegraphing substrate 14 of the aviation panel assembly 10 may further comprise a wood sub-layer 28. The backing layer 20, the wood sub-layer together 28, and a second adhesive layer 30 form a non-telegraphing substrate 32. The second adhesive layer 30 attaches the wood sub-layer 28 to the second side 24 of the backing layer 20. The wood sub-layer 28 may have one or more plies (layers) as known in the art. As noted previously, the wood sub-layer is often referred to as "aviation plywood." The wood sub-layer 28 covers the second side 24 of the backing layer 20. The plies may be balanced, i.e., arranged such that the direction of the grain pattern in each ply alternates with the direction of the grain pattern in the overlying and/or underlying ply. Balance substantially prevents the substrate and aviation panel assembly from curling or bending. The wood sub-layer 28 includes a grain pattern as shown in FIG. 3.

The second adhesive layer 30 comprises a second adhesive for attaching the wood sub-layer 28 to the second side 24 of the backing layer 20. Exemplary non-limiting second adhesives that may be used include a phenolic dry film (PGF), an epoxy-based dry film, a polyurethane dry film, a PVA film, or the like. Other adhesives conventionally used in the wood industry may be used for the second adhesive and the second adhesive layer 30. The second adhesive may be the same material as or different from the first adhesive.

The incombustible, non-telegraphing substrate 14 (whether comprising the backing layer 2) or the backing layer and the wood sub-layer (FIGS. 3 and 4)) further comprises a fire retardant chemical rendering a non-telegraphing substrate incombustible. The non-telegraphing substrate may comprise the backing layer and the wood sub-layer. The non-telegraphing substrate is treated for fire protection such that the non-telegraphing substrate becomes the incombustible, non-telegraphing substrate. The fire retardant chemical may be a salt-based fire retardant chemical. For example, a suitable fire retardant chemical is available from Booth Veneers, 510 Patrol Road, Jeffersonville, Ind. (U.S.A) having a name of FRC-1. Another suitable fire retardant chemical is available from Eagle Performance Products, 340 Beamer Road, Calhoun, Ga. (U.S.A.) under the name TFP-III. TIP-III is a water soluble blend of fire retardant additives and is phosphorous/halogen-based (i.e., a salt-based fire retardant chemical).

If desired, according to various embodiments, the aviation panel assembly 10 comprising the decorative aviation veneer 12 may be adhered to the incombustible, non-telegraphing substrate 14 and may be treated for fire protection such that the entire aviation panel assembly 10 is incombustible. In various embodiments, the aviation panel assembly 10 may not be treated for fire protection such that the aviation panel assembly comprises the untreated decorative aviation veneer and the incombustible, non-telegraphing substrate 14.

Figure 4:
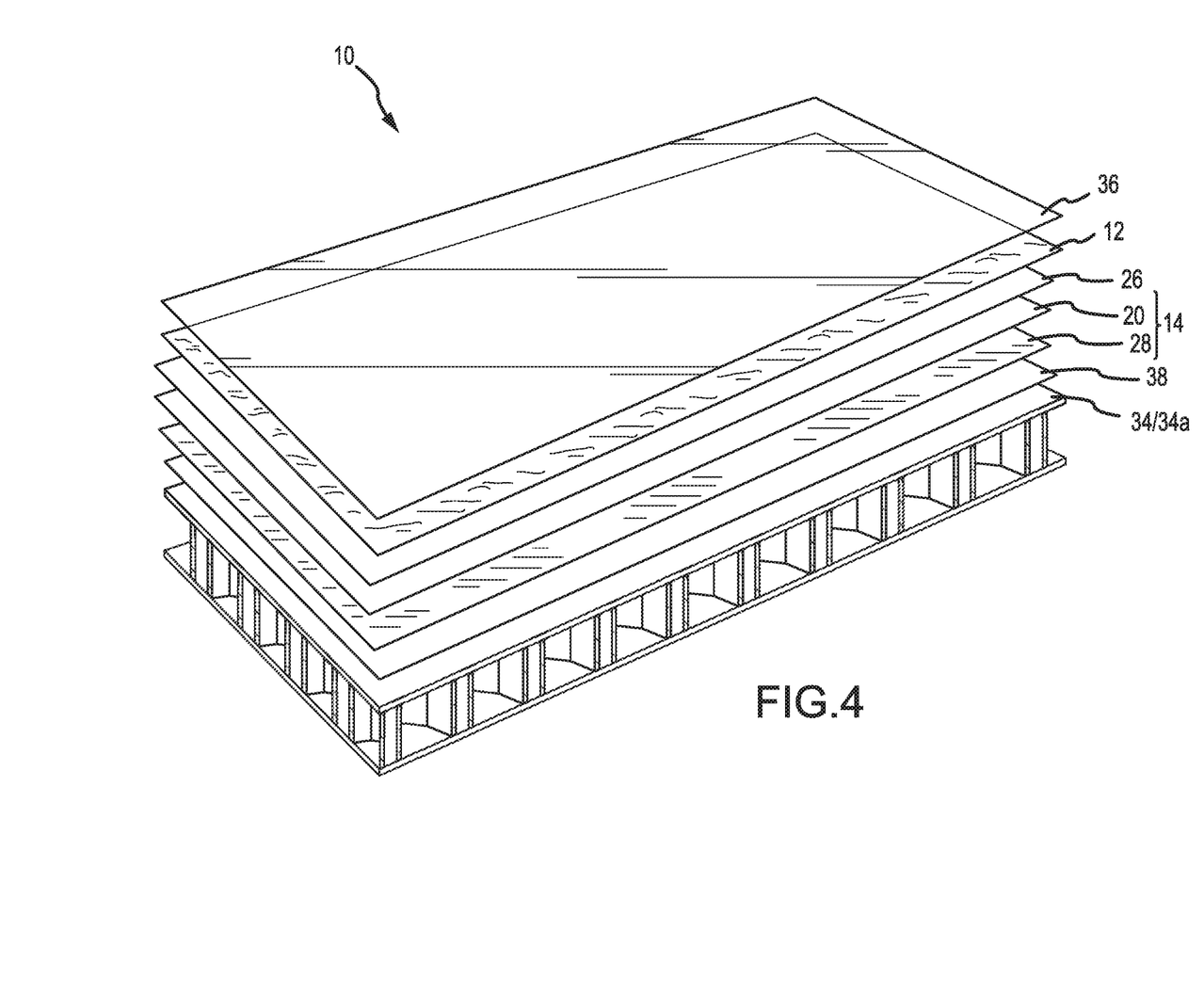
FIG. 4 is a schematic assembly diagram of an exemplary aviation panel assembly, according to various embodiments.

Referring now to FIG. 4, according to various embodiments, the aviation panel assembly 10 may further comprise a structural element 34 and/or a prefinish layer 36. For example, in the aviation panel assembly 10 of FIG. 4, the decorative aviation veneer 12 faces the incombustible, non-telegraphing substrate 14. The first adhesive layer 26 is between the decorative aviation veneer 12 and the incombustible, non-telegraphing substrate 14 (more particularly, between the decorative aviation veneer 12 and the backing layer 20 of the incombustible, non-telegraphing substrate 14). The second adhesive layer 30 is between the backing layer 20 and the wood sub-layer 28. The illustrated wood sub-layer 28 is one ply. A honeycomb panel 34a exemplifies the structural element 34 in FIG. 4. The honeycomb panel 34a is shown attached to an exposed ply of the wood sub-layer 28. A third adhesive layer 38 is between the honeycomb layer 34a and the wood sub-layer 28. The third adhesive layer 38 comprises a third adhesive. The third adhesive layer 38 comprises a third adhesive for attaching the structural element 34 (e.g., the honeycomb panel 34a in FIG. 4) to the aviation panel assembly 10 (more particularly, to the exposed ply of the wood sub-layer 28). Exemplary, non-limiting third adhesives that may be used include a phenolic dry glue film (PGF), an epoxy-based dry film, a polyurethane dry film, a PVA film, or the like. Other adhesives conventionally used in the wood industry may be used for the third adhesive and the third adhesive layer. The third adhesive may be the same as or different from at least one of the first adhesive or the second adhesive. The structural element (as exemplified in FIG. 4 as the honeycomb panel) may be attached to the aviation panel assembly by various methods as known in the art, such as by an adhesive material or the like. The prefinish layer 36 of FIG. 4 may be a protectant or the like for the decorative aviation veneer. The structural element and/or prefinish layer may be added after installation of the incombustible, non-telegraphing substrate in the aviation panel assembly.

Structural elements such as the honeycomb panel may alternatively or additionally be included in the aviation panel assembly, depending upon the intended use of the aviation panel assembly. In use, the aviation panel assemblies are used in aircraft interiors to build interior walls, cabinets, peripherals, etc.

Figure 5:
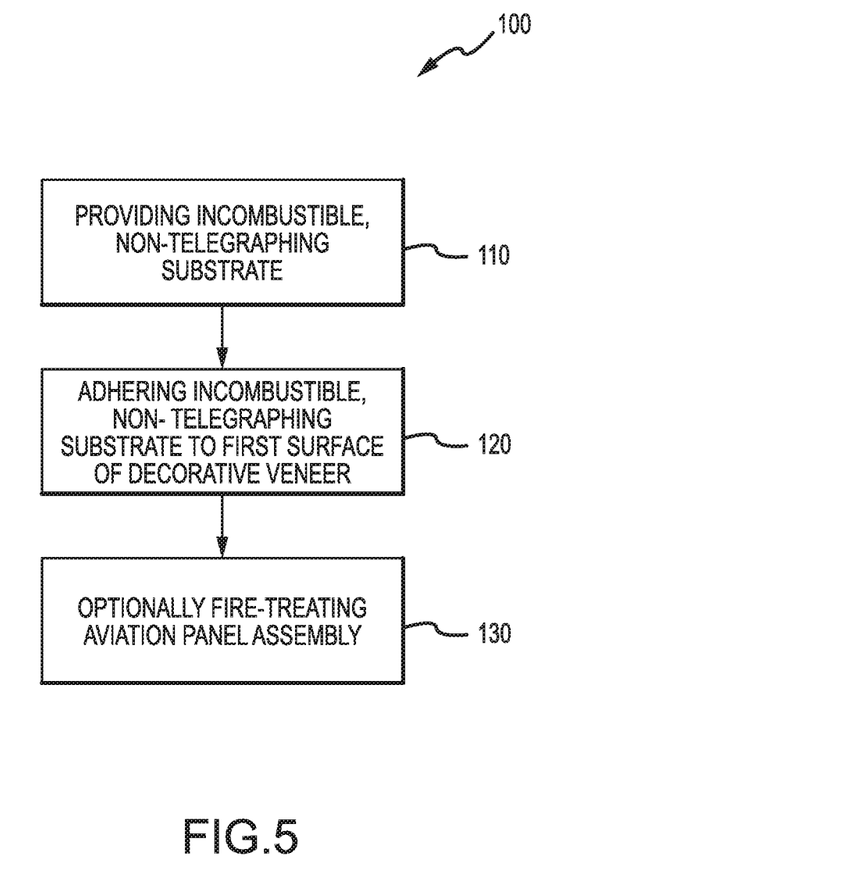
FIG. 5 is a flow diagram of a method for installing an incombustible, non-telegraphing substrate into an aviation panel assembly, according to various embodiments.

Referring now to FIG. 5, according to various embodiments, a method 100 for installing the incombustible, non-telegraphing substrate in an aviation panel assembly begins by providing the incombustible, non-telegraphing substrate (step 110) as previously described. More specifically, providing the incombustible, non-telegraphing substrate 14 comprises providing the backing layer 20 and optionally, the wood sub-layer 28. If the wood sub-layer is used, the backing layer and the wood sub-layer are attached by the second adhesive. The second adhesive layer 30 is between the backing layer 20 and the wood sub-layer 28. The non-telegraphing substrate 32 is fire treated to become incombustible as previously described.

Still referring to FIG. 5, according to various embodiments, the method 100 for installing the incombustible, non-telegraphing substrate in an aviation panel assembly continues by adhering the incombustible, non-telegraphing substrate 14 to the first surface 16 of the decorative aviation veneer 12 (step 120). Adhering the incombustible, non-telegraphing substrate comprises adhering the first side of the backing layer to cover the first surface of the decorative aviation veneer. Adhering the incombustible, non-telegraphing substrate comprises adhering the first side of the backing layer directly to the first surface of the decorative aviation veneer.

Still referring to FIG. 5, the method 100 for installing the incombustible, non-telegraphing substrate in the aviation panel assembly continues by optionally fire treating the aviation panel assembly (optional step 130). The aviation panel assembly may be fire treated with a fire retardant chemical in the same manner as the non-telegraphing substrate, i.e., with a fire-retardant chemical as known in the art.

From the foregoing, it is to be appreciated that various embodiments prevent telegraphing of a grain pattern from an underlying material (e.g., a wood sub-layer) into a decorative aviation veneer of the aviation panel assembly and are incombustible. As a result, customer returns, replacement, repair, and waste of aviation panel assemblies and decorative aviation veneers are reduced, thereby lowering costs that would otherwise be incurred.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage; or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(t) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An incombustible, non-telegraphing substrate for facing with a decorative wood aviation veneer, the incombustible, non-telegraphing substrate comprising:
   a backing layer comprising a polymer resin-impregnated paper;
   a fire-retardant chemical included in the backing layer and rendering the backing layer incombustible; and
   a wood sub-layer attached to the backing layer, the wood sub-layer comprising,
      a first ply having a first grain orientation, and
      a second ply underlying the first ply, the second ply having a second grain orientation different from the first grain orientation.

2. The incombustible, non-telegraphing substrate of claim 1, wherein the decorative wood aviation veneer has a first surface and a second surface opposite to the first surface and the backing layer is configured to cover the first surface of the decorative wood aviation veneer.

3. The incombustible, non-telegraphing substrate of claim 2, wherein a first adhesive attaches a first side of the backing layer to the first surface of the decorative wood aviation veneer.

4. The incombustible, non-telegraphing substrate of claim 3, further comprising a wood sub-layer having a ply covering a second side of the backing layer, the wood sub-layer also including a fire-retardant chemical.

5. The incombustible, non-telegraphing substrate of claim 4, wherein the wood sub-layer is adhered to the second side of the backing layer.

6. The incombustible, non-telegraphing substrate of claim 5, wherein a second adhesive attaches the wood sub-layer to the second side of the backing layer.

7. An aviation panel assembly comprising:
   a decorative aviation veneer comprising a species of wood;
   an incombustible, non-telegraphing substrate faced with the decorative aviation veneer, the incombustible, non-telegraphing substrate comprising:
      a backing layer comprising a polymer-resin impregnated paper, wherein a first side of the backing layer is attached to the decorative aviation veneer;
      a wood sub-layer attached to a second side of the backing layer opposite the first side of the backing layer; and
      a fire-retardant chemical included in the backing layer and the wood sub-layer; and
   a first adhesive layer between the first side of the backing layer and the decorative aviation veneer.

8. The aviation panel assembly of claim 7, wherein the decorative aviation veneer has a first surface and a second surface opposite the first surface, the backing layer has a first side and a second side, and the first adhesive layer is between the first side of the backing layer and the first surface of the decorative aviation veneer.

9. The aviation panel assembly of claim 8, wherein the incombustible, non-telegraphing substrate backing layer directly covers the first surface of the decorative aviation veneer.

10. The aviation panel assembly of claim 8, further comprising:
   a wood sub-layer of one ply; and
   a second adhesive layer between the wood sub-layer and the second side of the backing layer.

11. The aviation panel assembly of claim 9, wherein the wood sub-layer covers the second side of the backing layer.

12. The aviation panel assembly of claim 7, wherein the aviation panel assembly is configured for an aircraft interior and the first surface of the decorative aviation veneer is configured to be visible therein.

13. The aviation panel assembly of claim 10, further comprising:
   a honeycomb panel; and
   a third adhesive layer between the honeycomb panel and at least one of the backing layer or the wood sub-layer.

14. A method for installing an incombustible, non-telegraphing substrate in an aviation panel assembly comprising:
   adhering a backing layer of the incombustible, non-telegraphing substrate to a first surface of a decorative wood aviation veneer, the backing layer comprising a polymer resin-impregnated paper; and
   adhering a wood sub-layer to a side of the backing layer opposite the decorative wood aviation veneer.

15. The method of claim 14, wherein adhering the backing layer covers the first surface of the decorative aviation veneer.

16. The method of claim 15, wherein adhering the incombustible, non-telegraphing substrate comprises adhering the first side of the backing layer directly to the first surface of the decorative aviation veneer.

17. The method of claim 16, further comprising, prior to adhering the incombustible, non-telegraphing substrate to the first surface of the decorative aviation veneer:
   adhering the wood sub-layer to the second side of the backing layer; and
   fire treating the backing layer and wood sub-layer after adhering the wood sub-layer to the second side of the backing layer.

18. The method of claim 17, further comprising fire treating the aviation panel assembly after adhering the incombustible, non-telegraphing substrate to the first surface of the decorative aviation veneer.

19. The method of claim 17, further comprising attaching a structural member to an exposed ply of the wood sub-layer.

20. The method of claim 19, wherein attaching the structural member to the exposed ply comprises adhering the structural member to the exposed ply of the wood sub-layer using a third adhesive.

* * * * *